US012541538B2

(12) United States Patent
Mishina et al.

(10) Patent No.: US 12,541,538 B2
(45) Date of Patent: Feb. 3, 2026

(54) CLUSTERING APPARATUS, CLUSTERING METHOD, AND PROGRAM

(71) Applicant: NIPPON TELEGRAPH AND TELEPHONE CORPORATION, Tokyo (JP)

(72) Inventors: Ibuki Mishina, Tokyo (JP); Dai Ikarashi, Tokyo (JP); Koki Hamada, Tokyo (JP); Ryo Kikuchi, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/696,083

(22) PCT Filed: Jan. 7, 2022

(86) PCT No.: PCT/JP2022/000318
§ 371 (c)(1),
(2) Date: Mar. 27, 2024

(87) PCT Pub. No.: WO2023/058255
PCT Pub. Date: Apr. 13, 2023

(65) Prior Publication Data
US 2025/0053577 A1      Feb. 13, 2025

(30) Foreign Application Priority Data

Oct. 8, 2021   (WO) .................. PCT/JP2021/037405

(51) Int. Cl.
*G06F 16/20*         (2019.01)
*G06F 16/23*         (2019.01)
(Continued)

(52) U.S. Cl.
CPC ........ *G06F 16/285* (2019.01); *G06F 16/2379* (2019.01); *G06F 21/602* (2013.01)

(58) Field of Classification Search
None
See application file for complete search history.

(56) References Cited

U.S. PATENT DOCUMENTS 8,285,658 B1 *  10/2012  Kellas-Dicks ........ G06F 21/316
                                                  706/45
10,452,716 B2 *  10/2019  Schimunek ............. G06F 16/13
(Continued)

OTHER PUBLICATIONS

Mishina et al. (2021) "Privacy Preserving Agglomerative Clustering in Secure Computation", Proceedings of Computer Security Symposium 2021, 2021 Information Processing Society of Japan, pp. 140-147, Oct. 19, 2021 [online] Accessed on Mar. 14, 2022, website: https://ipsj.ixsq.nii.ac.jp/ej/index.php?active_action=repository_view_main_item_detail&page_id=13&block_id=8&item_id=214419&item_no=I, with translation generated by computer.

(Continued)

*Primary Examiner* — Jau Shya Meng

(57) ABSTRACT

Provided is a clustering apparatus capable of securely performing hierarchical clustering while concealing all of a calculation process and values in the middle. A clustering apparatus includes: a cluster ID update unit that combines two clusters closest to each other and updates a cluster ID of a cluster ID table in which a data ID and a cluster ID are associated with each other on a one-to-one basis; and an inter-cluster distance update unit that executes deletion processing of deleting information corresponding to clusters to be combined from an inter-cluster distance table that is a table of distances between all clusters and addition processing of adding a distance between a newly combined cluster and another cluster to the inter-cluster distance table, and updates the inter-cluster distance table, in which information of the cluster ID table and the inter-cluster distance table is encrypted, and processing in the cluster ID update unit and the addition processing in the inter-cluster distance update unit are performed by using information encrypted without being decrypted.

9 Claims, 19 Drawing Sheets

(51) Int. Cl.
*G06F 16/28* (2019.01)
*G06F 21/60* (2013.01)

(56) References Cited

U.S. PATENT DOCUMENTS

| | | | |
|---|---|---|---|
| 2011/0078144 A1* | 3/2011 | Helfman | G06F 18/231 |
| | | | 707/E17.091 |
| 2011/0145238 A1* | 6/2011 | Stork | G06F 18/231 |
| | | | 707/E17.047 |
| 2021/0406474 A1* | 12/2021 | Jalali | G06F 40/30 |
| 2023/0021483 A1* | 1/2023 | Ishii | C12Q 1/6876 |

OTHER PUBLICATIONS

Lance-Williams updating formula (2010) [online] Accessed on14 Mar. 2022, website: https://ibisforest.org/index.php?Lance-Williams%20updating%20formula, with translation generated by computer.
Choi et al. (2017) "Anonymizing Train History using Hierarchical Clustering" Summary of 2017 Symposium on Cryptography and Information Security, Jan. 24-27, 2017, 9 pages.
Stephen C Johnson (1967) "Hierarchical clustering schemes" Psychometrika, vol. 32, No. 3, pp. 241-254.
Lance et al. (1967) "A general theory of classificatory sorting strategies: 1. hierarchical systems", The Computer Journal, vol. 9, No. 4, pp. 373-380.
Hamidi Mona et al. (2018) "A Secure Distributed Framework for Agglomerative Hierarchical Clustering Construction", 2018 26th Euromicro International Conference on Parallel, Distributed and Network-Based Processing (PDP), IEEE, Mar. 21, 2018 (Mar. 21, 2018), pp. 430-435, XP033353766, DOI: 10.1109/PDP2018.2018.00075 [retrieved on Jun. 6, 2018].

* cited by examiner

$D_{data}$

| DATA ID① | DATA ID② | DISTANCE |
|---|---|---|
| [A] | [B] | [$d_{AB}$] |
| [A] | [C] | [$d_{AC}$] |
| [A] | [D] | [$d_{AD}$] |
| ⋮ | ⋮ | ⋮ |
| [D] | [E] | [$d_{DE}$] |

$D_{dust}$

| CLUSTER ID① | CLUSTER ID② | DISTANCE |
|---|---|---|
| [0] | [1] | [$d_{01}$] |
| [0] | [2] | [$d_{02}$] |
| [0] | [3] | [$d_{03}$] |
| ⋮ | ⋮ | ⋮ |
| [3] | [4] | [$d_{34}$] |

$D_{out}$

| CLUSTER ID① | CLUSTER ID② | DISTANCE |
|---|---|---|
| [0] | [1] | [$d_{01}$] |
| [2] | [3] | [$d_{23}$] |
| [5] | [6] | [$d_{56}$] |
| [7] | [4] | [$d_{74}$] |

FIG.6

Algorithm 1 SECURE COMPUTATION HIERARCHICAL CLUSTERING

Require: DATA $[X]$ ($m \times n$ MATRIX)

Ensure: TABLE $[D_{out}]$ OF DISTANCES BETWEEN COMBINED CLUSTERS

1: INITIALIZATION OF CLUSTER ID $[cid_{new}] = [m]$
2: INITIALIZATION OF CLUSTER ID TABLE $[C_{id}]$
3: INITIALIZE $[D_{out}]$ AS EMPTY TABLE
4: CALCULATION OF TABLE $[D_{data}]$ OF DISTANCES BETWEEN ALL DATA
   $[D_{data}] = \text{calcDataDist}([X])$
5: CALCULATION OF DISTANCE TABLE $[D_{clust}]$ BETWEEN ALL CLUSTERS
   $[D_{clust}] = \text{calcClustDist}([X])$
6: for $i = 0, 1, \ldots, m-2$ do
7:   ACQUIRE IDS ($[cid_1], [cid_2]$) OF CLUSTERS CLOSEST TO EACH OTHER AND DISTANCE $[d]$ FROM $[D_{clust}]$
   $[cid_1], [cid_2], [d] = \text{getClosestClust}([D_{clust}])$
8:   UPDATE OF $[C_{id}]$
   $[C_{id}] = \text{updateCid}([cid_1], [cid_2], [C_{id}], [cid_{new}])$
9:   UPDATE OF $[D_{out}]$
   $[D_{out}] = \text{updateDout}([cid_1], [cid_2], [d], [D_{out}])$
10:   UPDATE OF $[D_{clust}]$
    $[D_{clust}] = \text{updateClustDist}([cid_1], [cid_2], [D_{data}], [D_{clust}])$
11:   $[cid_{new}] = [cid_{new}] + 1$

FIG. 7

Algorithm 2 updateCid (UPDATE OF CLUSTER ID TABLE)

Require: $[cid_1], [cid_2], [C_{id}], [cid_{new}]$
Ensure: UPDATED $[C_{id}]$ 1: EXTRACT COLUMN $[\vec{c_{id}}]$ OF CLUSTER ID FROM $C_{id}$
2: $[\vec{c_1}] = \text{equality}([\vec{c_{id}}], [cid_1])$
3: $[\vec{c_2}] = \text{equality}([\vec{c_{id}}], [cid_2])$
4: $[\vec{c}] = \text{or}([\vec{c_1}], [\vec{c_2}])$
5: $[\vec{c_{not}}] = \text{not}([\vec{c}])$
6: $[\vec{c}] = [\vec{c}] \times [cid_{new}]$
7: $[\vec{c_{not}}] = [\vec{c_{not}}] \times [\vec{c_{id}}]$
8: $[\vec{c_{id}}] = [\vec{c}] + [\vec{c_{not}}]$
9: REPLACE COLUMN OF CLUSTER ID OF $[C_{id}]$ WITH $[\vec{c_{id}}]$

FIG.8

| Algorithm 3 DELETION ALGORITHM FOR INFORMATION THAT HAS BECOME UNNECESSARY |
| --- |
| Require: $[\![cid_1]\!], [\![cid_2]\!], [\![D_{clust}]\!]$ |
| Ensure: $[\![D'_{clust}]\!]$ FROM WHICH INFORMATION THAT HAS BECOME UNNECESSARY IS DELETED |
| 1: $[\![D'_{clust}]\!] = \text{shuffle}([\![D_{clust}]\!])$ |
| 2: EXTRACT COLUMN $[\![\vec{id}_1]\!]$ OF ID1 FROM $[\![D'_{clust}]\!]$ |
| 3: $[\![\vec{c_1}]\!] = \text{equality}([\![\vec{id}_1]\!], [\![cid_1]\!])$ |
| 4: $[\![\vec{c_2}]\!] = \text{equality}([\![\vec{id}_1]\!], [\![cid_2]\!])$ |
| 5: $[\![\vec{c}]\!] = \text{or}([\![\vec{c_1}]\!], [\![\vec{c_2}]\!])$ |
| 6: EXTRACT COLUMN $[\![\vec{id}_2]\!]$ OF ID2 FROM $[\![D'_{clust}]\!]$ |
| 7: $[\![\vec{c_1}]\!] = \text{equality}([\![\vec{id}_2]\!], [\![cid_1]\!])$ |
| 8: $[\![\vec{c_2}]\!] = \text{equality}([\![\vec{id}_2]\!], [\![cid_2]\!])$ |
| 9: $[\![\vec{c'}]\!] = \text{or}([\![\vec{c_1}]\!], [\![\vec{c_2}]\!])$ |
| 10: $[\![\vec{c}]\!] = \text{or}([\![\vec{c}]\!], [\![\vec{c'}]\!])$ |
| 11: $[\![\vec{c}_{not}]\!] = \text{not}([\![\vec{c}]\!])$ |
| 12: $\vec{c}_{not} = \text{reveal}([\![\vec{c}_{not}]\!])$ |
| 13: DELETE UNNECESSARY ROW FROM $[\![D'_{clust}]\!]$ ON THE BASIS OF PORTION WHERE FLAG OF $\vec{c}_{not}$ IS 0 |

Algorithm 1 SECURE COMPUTATION HIERARCHICAL CLUSTERING

Require: DATA $[X]$ ($m \times n$ MATRIX)
Ensure: TABLE $[D_{out}]$ OF DISTANCES BETWEEN COMBINED CLUSTERS 1:  INITIALIZATION OF CLUSTER ID $[rid_{new}] = [m]$
2:  INITIALIZATION OF CLUSTER ID TABLE $[C_{id}]$
3:  INITIALIZE $[D_{out}]$ AS EMPTY TABLE
4:  CALCULATION OF DISTANCE TABLE $[[D_{clust}]]$ BETWEEN ALL CLUSTERS
    $[D_{clust}] = \text{calcClustDist}([X])$
5:  for $i = 0, 1, \ldots, m-2$ do
6:      ACQUIRE IDS $([rid_1], [rid_2])$ OF CLUSTERS CLOSEST TO EACH OTHER AND DISTANCE $[d]$ FROM $[[D_{clust}]]$
        $[rid_1], [rid_2], [d] = \text{getClosestClust}([D_{clust}])$
7:      UPDATE OF $[C_{id}]$
        $[C_{id}] = \text{updateCid}([rid_1], [rid_2], [C_{id}], [rid_{new}])$
8:      UPDATE OF $[D_{out}]$
        $[D_{out}] = \text{updateDout}([rid_1], [rid_2], [d], [D_{out}])$
9:      UPDATE OF $[D_{clust}]$
        $[D_{clust}] = \text{updateClustDist}([rid_1], [rid_2], [D_{clust}])$
10:     $[rid_{new}] = [rid_{new}] + 1$

FIG.16

PROCEDURE 1

| CLUSTER ID① | CLUSTER ID② | DISTANCE |
|---|---|---|
| [0] | [1] | $[d_{01}]$ |
| [0] | [2] | $[d_{02}]$ |
| [1] | [3] | $[d_{13}]$ |
| [2] | [3] | $[d_{23}]$ |

PROCEDURE 2

| CLUSTER ID① | CLUSTER ID② | DISTANCE |
|---|---|---|
| [0] | [1] | $[d_{01}] \times [1]$ |
| [0] | [2] | $[d_{02}]$ |
| [1] | [3] | $[d_{13}] \times [1]$ |
| [2] | [3] | $[d_{23}]$ |

PROCEDURE 3

| CLUSTER ID① | CLUSTER ID② | DISTANCE |
|---|---|---|
| [0] | [1] | $[d_{01}] \times [1]$ |
| [0] | [2] | $[d_{02}] \times [1]$ |
| [1] | [3] | $[d_{13}] \times [1]$ |
| [2] | [3] | $[d_{23}] \times [1]$ |

PROCEDURE 4

| CLUSTER ID | DISTANCE |
|---|---|
| [0] | $[d_{01}] \times [1]$ $+ [d_{02}] \times [1]$ |
| [3] | $[d_{23}] \times [1]$ $+ [d_{23}] \times [1]$ |

CLUSTERING APPARATUS, CLUSTERING METHOD, AND PROGRAM

CROSS-REFERENCE TO RELATED APPLICATIONS

This application is a U.S. 371 Application of International Patent Application No. PCT/JP2022/000318, filed on 7 Jan. 2022, which application claims priority to and the benefit of International Patent Application No. PCT/JP2021/037405, filed on 8 Oct. 2021, the disclosures of which are hereby incorporated herein by reference in their entireties.

TECHNICAL FIELD

The present invention relates to a hierarchical clustering technique.

BACKGROUND ART

Non Patent Literature 1 is known as a conventional technique of the hierarchical clustering technique. In addition, hierarchical clustering is performed in plaintext in the hclust function of R, the linkage function of scipy, and the like. Note that R is a language and environment for statistical calculation and graphics, and scipy is a library for performing advanced scientific calculation.

CITATION LIST

Non Patent Literature

Non Patent Literature 1: Stephen C Johnson, "Hierarchical clustering schemes", Psychometrika, Vol. 32, No. 3, pp. 241-254, 1967.
Non Patent Literature 2: Godfrey N Lance and William Thomas Williams. A general theory of classificatory sorting strategies:1. hierarchical systems. The computer journal, Vol. 9, No. 4, pp. 373-380, 1967.

SUMMARY OF INVENTION

Technical Problem

However, in the conventional technique, hierarchical clustering cannot be securely calculated while learning data and a value in the middle of calculation are encrypted.

An object of the present invention is to provide a clustering apparatus, a clustering method, and a program capable of securely performing hierarchical clustering while concealing all of a calculation process and values in the middle by devising management of data points included in a cluster, distances between data or between clusters, and the like using a table.

Solution to Problem

To solve the above problem, according to an aspect of the present invention, a clustering apparatus includes: a cluster ID update unit that combines two clusters closest to each other and updates a cluster ID of a cluster ID table in which a data ID and a cluster ID are associated with each other on a one-to-one basis; and an inter-cluster distance update unit that executes deletion processing of deleting information corresponding to clusters to be combined from an inter-cluster distance table that is a table of distances between all clusters and addition processing of adding a distance between a newly combined cluster and another cluster to the inter-cluster distance table, and updates the inter-cluster distance table, in which information of the cluster ID table and the inter-cluster distance table is encrypted, and processing in the cluster ID update unit and the addition processing in the inter-cluster distance update unit are performed by using information encrypted without being decrypted.

Advantageous Effects of Invention

According to the present invention, it is possible to securely perform hierarchical clustering while concealing all of the calculation process and values in the middle.

BRIEF DESCRIPTION OF DRAWINGS

FIG. 4 is a diagram for explaining a procedure for updating a cluster ID table.
FIG. 5 is a diagram illustrating an example of each of distance tables.
FIG. 6 is a diagram for explaining a main algorithm [Method 1] for secure computation hierarchical clustering.
FIG. 7 is a diagram for explaining an algorithm for updating a cluster ID table.
FIG. 8 is a diagram for explaining an algorithm for deleting information that has become unnecessary.
FIG. 11 is a diagram for explaining a flow of processing for creating the key information →k.
FIG. 14 is a diagram for explaining a main algorithm [Method 2] for secure computation hierarchical clustering.
FIG. 16 is a diagram illustrating each of procedures of inter-cluster distance calculation processing in the second embodiment.

DESCRIPTION OF EMBODIMENTS

Figure 1:
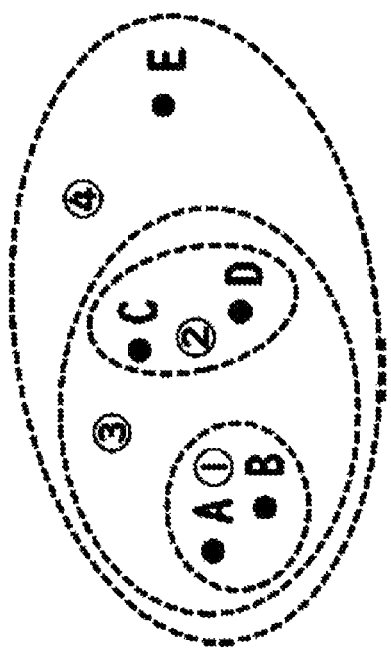
FIG. 1 is a diagram for explaining hierarchical clustering.

Hereinafter, embodiments of the present invention will be described. Note that, in the drawings to be used in the following description, components having the same functions or steps for performing the same processing will be denoted by the same reference numerals, and redundant description will be omitted. In the following description, a symbol "→" or the like used in the text should be originally described immediately above an immediately following character, but is described immediately before the character due to limitations of text notation. In formulas, these symbols are described at the original positions. In addition, processing performed in units of elements of a vector or a matrix is applied to all elements of the vector or the matrix unless otherwise specified.

First, before describing the embodiments, a technique used in the embodiments will be described.

<Hierarchical Clustering>

Clustering is one of machine learning methods classified as unsupervised learning. In supervised learning such as regression analysis and class classification, desired output (teacher data) is prepared, and its object is to construct a model that reproduces the output with high accuracy, whereas in unsupervised learning such as clustering, desired output is not determined in advance.

An object of clustering is to calculate a distance between a plurality of pieces of data given and to find data that are close in distance, that is, similar data. A clustering method is roughly classified into two, and there are a non-hierarchical method in which how many clusters are formed is determined in advance like a k-means method, and a hierarchical method in which the number of clusters is not defined in advance and clusters are formed in order from the most similar data. The latter "hierarchical clustering" is addressed in the embodiments.

As illustrated in FIG. 1, hierarchical clustering is an analysis method in which data are grouped into clusters in order from the closest data. A rough calculation procedure of hierarchical clustering will be described below.

1. Calculate distances between all data points.
2. Two data points whose distance is the shortest are defined as a new cluster.
3. A distance between the newly created cluster and another data point or another cluster is calculated.
4. Data points, a data point and a cluster, or clusters closest to each other are defined as a new cluster.
5. Procedures 3, and 4. are repeated until all data points become one cluster.

Figure 2:
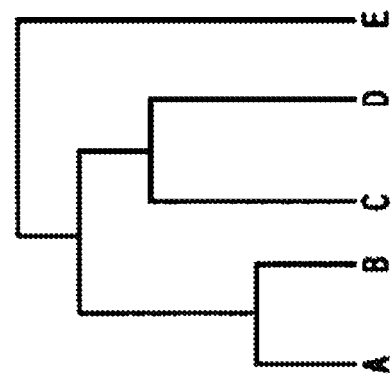
FIG. 2 is a diagram illustrating an example of a dendrogram (tree diagram) that can be obtained by hierarchical clustering.

An object of hierarchical clustering is to calculate distances between all data by such a calculation procedure, and finally obtain a dendrogram (tree diagram) as illustrated in FIG. 2. The dendrogram of FIG. 2 corresponds to a clustering result of FIG. 1, and represents that data A and B are closest, then C and D are close, then a cluster including A and B and a cluster including C and D are close, and E is the farthest. In this way, hierarchical clustering is used in a case where it is desired to view closeness of between data in detail.

What is important in calculating hierarchical clustering is "how to obtain a distance between data" and "how to obtain a distance between clusters". There is a plurality of methods, and methods used in the embodiments will be described below.

<Euclidean Distance>

A Euclidean distance is one of the most famous methods as a method for calculating a distance between data, and a distance $d(\vec{x}, \vec{y})$ of two data $\vec{x}=(x_1, x_2, \ldots, x_n)$ and $\vec{y}=(y_1, y_2, \ldots, y_n)$ is expressed by Formula (1) below.

[Math. 1]

$$d(\vec{x}, \vec{y}) = \sqrt{(x_1 - y_2)^2 + (x_2 - y_2)^2 + \cdots + (x_n - y_n)^2} \quad (1)$$

<Group Average Method>

A group average method is one of distance functions often used in calculating a distance between clusters. In hierarchical clustering of plaintext, a Ward's method is often used, but an amount of calculation is large although classification sensitivity is good. On the other hand, a simple method such as a shortest distance method or a longest distance method has a small amount of calculation but has a low classification sensitivity. The group average method has a smaller amount of calculation than the Ward's method, has better classification sensitivity than the shortest distance method and the longest distance method, and has a good balance between the amount of calculation and accuracy.

Figure 3:
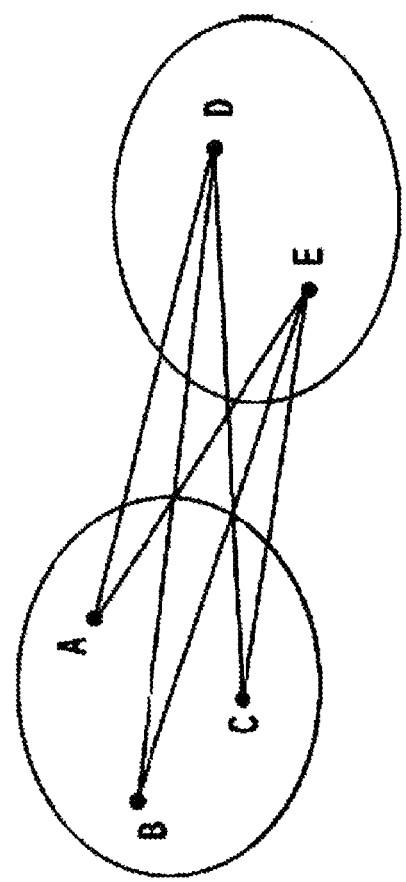
FIG. 3 is a diagram for explaining a group average method when a distance between two clusters is obtained.

In a case where a distance between two clusters, a cluster including data points A, B, and C and a cluster including data points D and E as illustrated in FIG. 3, is obtained by the group average method, an average of distances between all data points of the data points A, B, and C and the data points D and E is set as the distance between the clusters.

As described in <Hierarchical clustering> above, since all the distances between the data points are obtained first, it is only necessary to obtain an average value in calculating the distance between the clusters.

<Lance-Williams Updating Formula>

In hierarchical clustering, an update formula called a Lance-Williams updating formula (Non Patent Literature 2) is known as an efficient method for calculating a distance between a newly created cluster and another data point or cluster.

When a newly created cluster is defined as $C_1 = C_{1a} \cup C_{1b}$, and an update formula in a case where a distance between the new cluster $C_1$ and another cluster $C_2$ is obtained is expressed by Formula (2).

$$d(C_1, C_2) = \alpha_a d(C_{1a}, C_2) + \alpha_b d(C_{1b}, C_2) + \\ \beta d(C_{1a}, C_{1b}) + \gamma |d(C_{1a}, C_2) - d(C_{1b}, C_2)| \quad (2)$$

It is assumed that $n_i$ represents the number of elements in a cluster $C_i$, and $d(C_i, C_j)$ represents a distance between clusters. In addition, $\alpha_a$, $\alpha_b$, $\beta$, and $\gamma$ are coefficients corresponding to methods of calculating distances between the clusters. For example, in the case of the group average method, $\alpha_a = n_{1a}/n_1$, $\alpha_b = n_{1b}/n_1$, $\beta = 0$, and $\gamma = 0$ are defined, and when this is substituted into Formula (2), Formula (3) is obtained.

$$d(C_1, C_2) = (n_{1a}/n_1)d(C_{1a}, C_2) + (n_{1b}/n_1)d(C_{1b}, C_2) \quad (3)$$

Necessary information is only the number of data included in the cluster $C_{1a}$ and a distance to the other cluster $C_2$, and the number of data included in the cluster $C_{1b}$ and a distance to the other cluster $C_2$. In this way, a distance between new clusters can be calculated very easily by using the Lance-Williams updating formula.

<Secure Computation>

Notation: To distinguish between a plaintext and a ciphertext, a ciphertext of a is written as [[a]], and a text without parentheses is a plaintext. Main functions used in the embodiments are shown below.

Addition/subtraction/multiplication: Addition, subtraction, and multiplication of two ciphertexts [[a]] and [[b]] are processing of calculating ciphertexts [[a+b]],

[[a−b]], and [[a×b]], respectively. These operations are respectively written as [[a]]+[[b]], [[a]]−[[b]], [[a]]×[[b]], and the same notation is used in a case where inputs are vectors [[→a]] and [[→b]].

Product sum: Processing of calculating a product sum for each row of matrices [[A]] and [[B]] is written as hpsum([[A]], [[B]]), and hpsum([[A]], [[B]]) outputs a vector [[→c]] having a length m.

Group-By operation: Group-By Common is processing of generating intermediate data that can be commonly used in various Group-By operations such as Group-By Sum and Group-By Count. The intermediate data includes a substitution table [[→π]] and a flag [[→e]] indicating whether or not it is a boundary of a value of a key, and by using these, various Group-By operations using the same key are efficiently performed.

Performing Group-By Common by inputting a key vector [[→k]] is described as in Formula (4), performing Group-By Sum by using a sorted value attribute vector [[→a']] and the flag [[→e]] is described as in Formula (5), and performing Group-By Count is described as in Formula (6).

$$[[\to\pi]],[[\to e]],[[\to a']]\leftarrow\text{groupByCommon}([[\to a]],[[\to k]]) \quad (4)$$

$$[[\to c]]\leftarrow\text{groupBySum}([[\to a']],[[\to e]]) \quad (5)$$

$$[[\to d]]\leftarrow\text{groupByCount}([[\to a']],[[\to e]]) \quad (6)$$

Note that, even if there is no processing such as Group-By Common, secure computation hierarchical clustering can be calculated as long as each of Group-By Sum and Group-By Count can be executed. However, calculation efficiency is better when Group-By Common is used.

Others: There are equality([[a]], [[b]]) for performing equality determination, shuffle([[→a]]) for performing secret shuffling, sort([[→a]]) for performing secret sorting, and([[a]], [[b]]) (logical product), or([[a]], [[b]]) (logical sum), and not([[a]]) (logical negation) for performing logical operations, and the like. In a case where an input of the secret shuffling or the secret sorting is a matrix, shuffling is performed in such a manner that each row is interchanged while a correspondence relationship of each row is maintained. In addition, processing of decrypting a ciphertext is written as reveal ([[a]]).

Since the above-described secure computation can be implemented by using various conventional techniques, description thereof will be omitted.

Next, the secure computation hierarchical clustering performed in the embodiments will be described.

<Secure Computation Hierarchical Clustering>

In the secure computation hierarchical clustering of the embodiments, values other than the number of data and values obvious from the number of data (how many times a clustering procedure is repeated, or the like) are kept secret. Specifically, calculation is performed while the following information is kept secret.

Feature value of data
Distance between data, or between data and a cluster, or between clusters
Which data points or clusters are combined
What data is included in each cluster
Number of data included in each cluster <Points of Secure Computation Hierarchical Clustering>

Points are indicated for performing hierarchical clustering while concealing information such as how many pieces of data are in which cluster and which data is included in which cluster.

(Management of Cluster Information)

Figure 4:
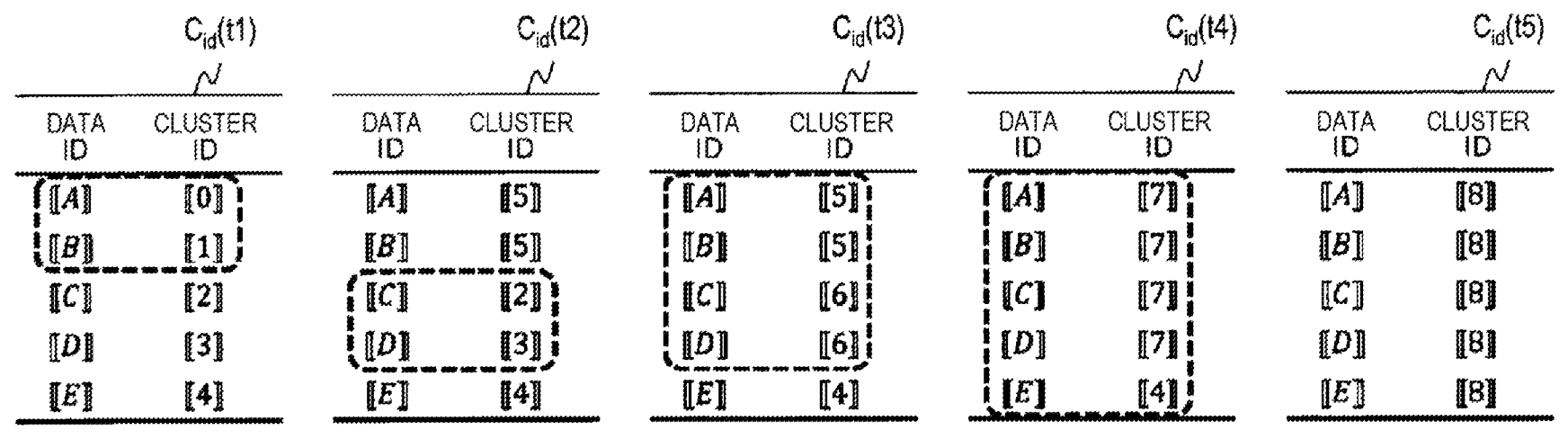

In the hierarchical clustering of the embodiments, it is necessary to store information indicating that "which data is included in each cluster" and to update the information each time data points or clusters are combined. In the embodiments, management is performed by using a table (cluster ID table) $C_{id}$ in which a data ID and a cluster ID are associated one-to-one as illustrated in FIG. 4. FIG. 4 illustrates how the cluster ID is updated in the cluster ID table $C_{id}$ corresponding to FIG. 1 or 2 in order from the left.

A rough procedure for updating the cluster ID table $C_{id}$ will be described.

1. As an initial value of the cluster ID, numbers are sequentially assigned to respective data from 0. $C_{id}(t1)$ in FIG. 4 is a cluster ID table after assignment.
2. Cluster IDs of data points included in clusters to be combined are rewritten to new ones (new cluster IDs are assigned with sequential numbers). $C_{id}(t2)$ to $C_{id}(t4)$ in FIG. 4 indicate cluster ID tables after rewriting.
3. 2. is repeated until all data become one cluster. $C_{id}(t5)$ in FIG. 4 indicates a cluster ID table after repetition.

In a first embodiment, as a method for managing distance information, [Method 1] is used out of two methods [Method 1] and [Method 2]. Method 2 is used in a second embodiment. (Management of distance information [Method 1])

In the hierarchical clustering [Method 1] of the first embodiment, it is necessary to store the distance between the data points and to store and update the distance between the clusters. In the secure computation hierarchical clustering of the present embodiment, the distance information is managed by the following three tables.

Table of distances between all data (inter-data distance table) $D_{data}$
Table of distances between all clusters (inter-cluster distance table) $D_{clust}$
Table of distances between combined clusters (output distance table) $D_{out}$ FIG. 5 illustrates an example of each distance table.

The inter-data distance table $D_{data}$ is a table that stores information on a distance between data of ID1 and ID2. For example, if ID1=A and ID2=B are defined, a distance between data points A and B is in the third column.

The inter-cluster distance table $D_{clust}$ is a table that stores information on a distance between clusters of ID1 and ID2. Since each data point is regarded as one cluster at the time of initialization, $D_{data}$ and $D_{clust}$ are the same table.

The output distance table $D_{out}$ corresponds to an output of the hierarchical clustering, and finally, a dendrogram is created on the basis of this table. The output distance table $D_{out}$ is an empty table at the time of initialization, but information on IDs and distances of two combined clusters is added every time clusters are combined.

The inter-data distance table $D_{data}$ is first created once and then reused, but the inter-cluster distance table $D_{clust}$ and the output distance table $D_{out}$ need to be updated each time clusters are combined.

The following two pieces of processing are particularly important for implementing the secure computation hierarchical clustering of the first embodiment.

Update of cluster ID table $C_{id}$
Update of inter-cluster distance table $D_{clust}$ In the first embodiment, as a main algorithm for the secure computation hierarchical clustering, [Method 1] is used out of two methods [Method 1] and [Method 2]. Method 2 is used in the second embodiment.

<Main Algorithm [Method 1] for Secure Computation Hierarchical Clustering>

A main algorithm [Method 1] for secure computation hierarchical clustering is illustrated in Algorithm 1 of FIG. 6, and then detailed processing of each function will be described.

A function calcDataDist(X) in the fourth line is processing of calculating the distances between all data. A method for calculating the distance may be any method, but in the first embodiment, the Euclidean distance illustrated in Formula (1) is used. Secure computation of the Euclidean distance can be performed only by subtraction and a product sum. Although calculation of a square root is included in Formula (1), only a magnitude relationship is focused in the clustering, and a result does not change even if the calculation of the square root is omitted, and thus the calculation of the square root is also omitted in the present embodiment.

A function calcClustDist(X) in the fifth line is processing of calculating the distances between all clusters, but since each data point is regarded as a cluster in an initial state, the inter-data distance table $D_{data}$ and the inter-cluster distance table $D_{clust}$ are the same table.

A function getClosestClust($D_{clust}$) in the seventh line is processing of acquiring IDs ($cid_1$, $cid_2$) of two clusters closest to each other and a distance d, and sorts the inter-cluster distance table $D_{clust}$ on secure computation using the distance as a key, and then acquires a head element (element with the smallest distance).

A function updateCid in the eighth line updates the cluster ID table $C_{id}$. A calculation procedure of updateCid is illustrated in Algorithm 2 of FIG. 7. A cluster ID of a newly combined cluster in the cluster ID table $C_{id}$ is updated.

A function updateDout in the ninth line is processing of simply adding $cid_1$, $cid_2$, and d to the end of the output distance table $D_{out}$.

<updateClustDist [Method 1]>

In the first embodiment, as a processing method for a function updateClustDist on the 10th line, [Method 1] is used out of two methods [Method 1] and [Method 2]. Method 2 is used in the second embodiment. The function updateClustDist in the 10th line updates the inter-cluster distance table $D_{clust}$. A calculation procedure of the function updateClustDist roughly includes the following two pieces of processing.
1. Information that has become unnecessary due to combination of clusters is deleted from [[$D_{clust}$]](see FIG. 8).
2. A distance between a newly combined cluster and another cluster is calculated and added to [[$D_{clust}$]].

A calculation procedure of deleting the information that has become unnecessary due to the combination of the clusters is illustrated in Algorithm 3 of FIG. 8.

In Algorithm 3 of FIG. 8, since information regarding [[$cid_1$]] and [[$cid_2$]] to be combined into one cluster is unnecessary, processing of leaving the other information is performed. Although [[→$c_{not}$]] is decrypted in the 11th line of FIG. 8, information known from a decryption result is only the number of rows to be deleted since shuffling is performed in the first line in advance. Since the number of rows deleted in each of steps is obvious from the number of records of learning data, there is no problem.

It is possible to implement processing corresponding to updateClustDist (update of a distance table between all clusters) of Algorithm 1 by adding a distance between a cluster newly created by the combination of the clusters and another cluster, which is calculated in the previous procedure, to a table from which unnecessary rows have been deleted by Algorithm 3.

(Method for Calculating Inter-Cluster Distance)

Next, a calculation procedure of a distance between a cluster newly created by the combination of the clusters and another cluster will be described.

Figure 9:
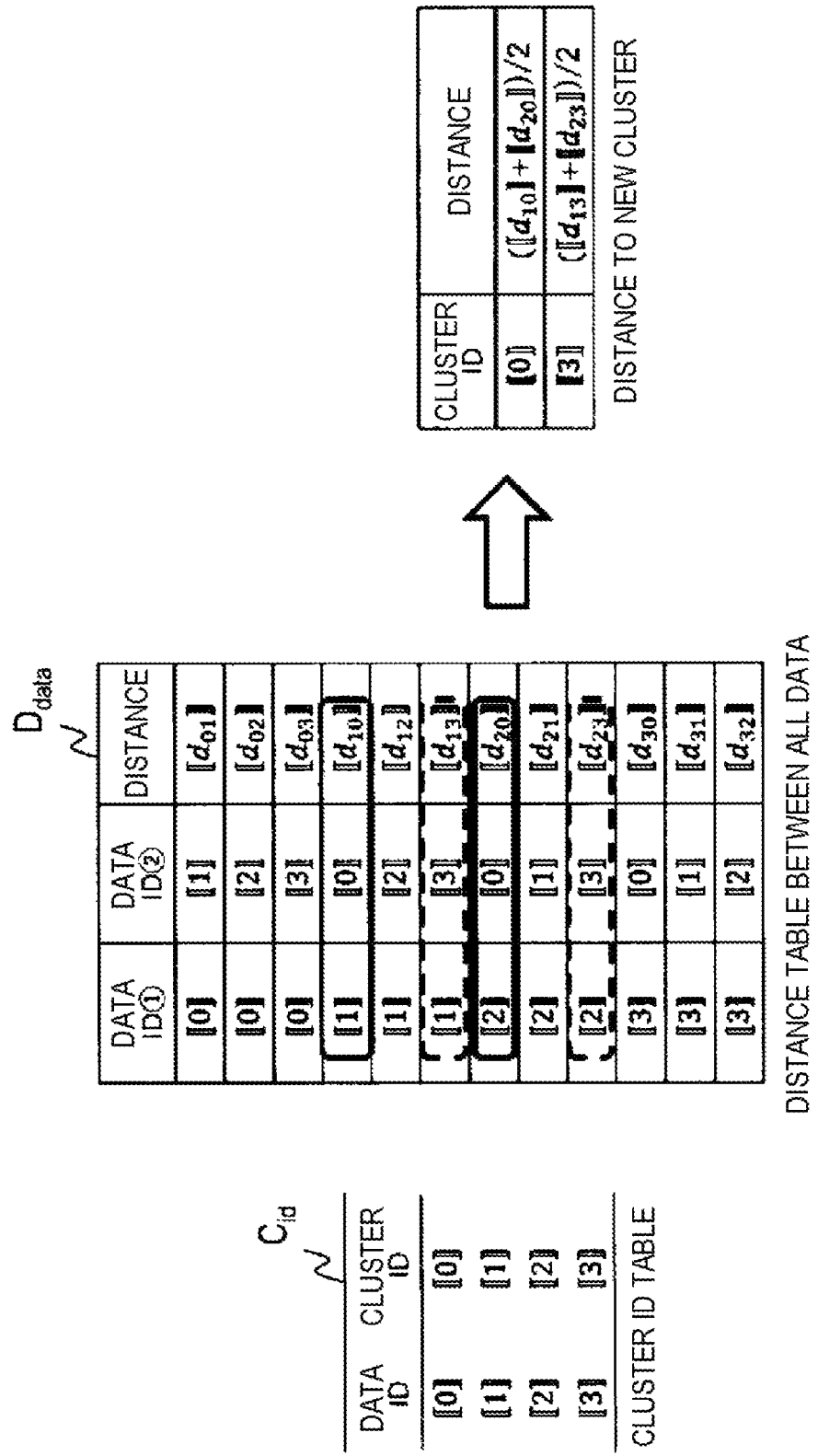
FIG. 9 is a diagram for explaining an image of processing after clusters are combined in a first embodiment.

As a specific example, FIG. 9 illustrates an image of processing in which there are four data points in total and after clusters with ID=1 and ID=2 are combined.

The clusters with ID=1 and ID=2 are combined to form a new cluster, and then a distance between the new cluster and another cluster (ID=0, ID=3) is obtained. For that reason, data that needs to be brought from the inter-data distance table $D_{data}$ satisfies the following two conditions at the same time.
1. Data ID1 is included in the two clusters to be combined.
2. Data ID2 is not included in the two clusters to be combined.

Data included in the two clusters to be combined are ID=1 and ID=2, and ID1=1 or ID1=2 are satisfied. Data not included in the two clusters to be combined are ID=0 and ID=3, so that ID2=0 or ID2=3 are satisfied. It is sufficient that four pieces of data having combinations of ID1 and ID2 of (1, 0), (1, 3), (2, 0), and (2, 3) are extracted. In a case where the distance between the clusters is obtained by using the group average method, an average value of distances between (1, 0) and (2, 0) is a distance $d_{O4}$ between a new cluster (cluster ID=4) and a cluster with a cluster ID=0, and an average value of distances between (1, 3) and (2, 3) is a distance $d_{34}$ between the new cluster (cluster ID=4) and a cluster with a cluster ID=3.

Figure 10:
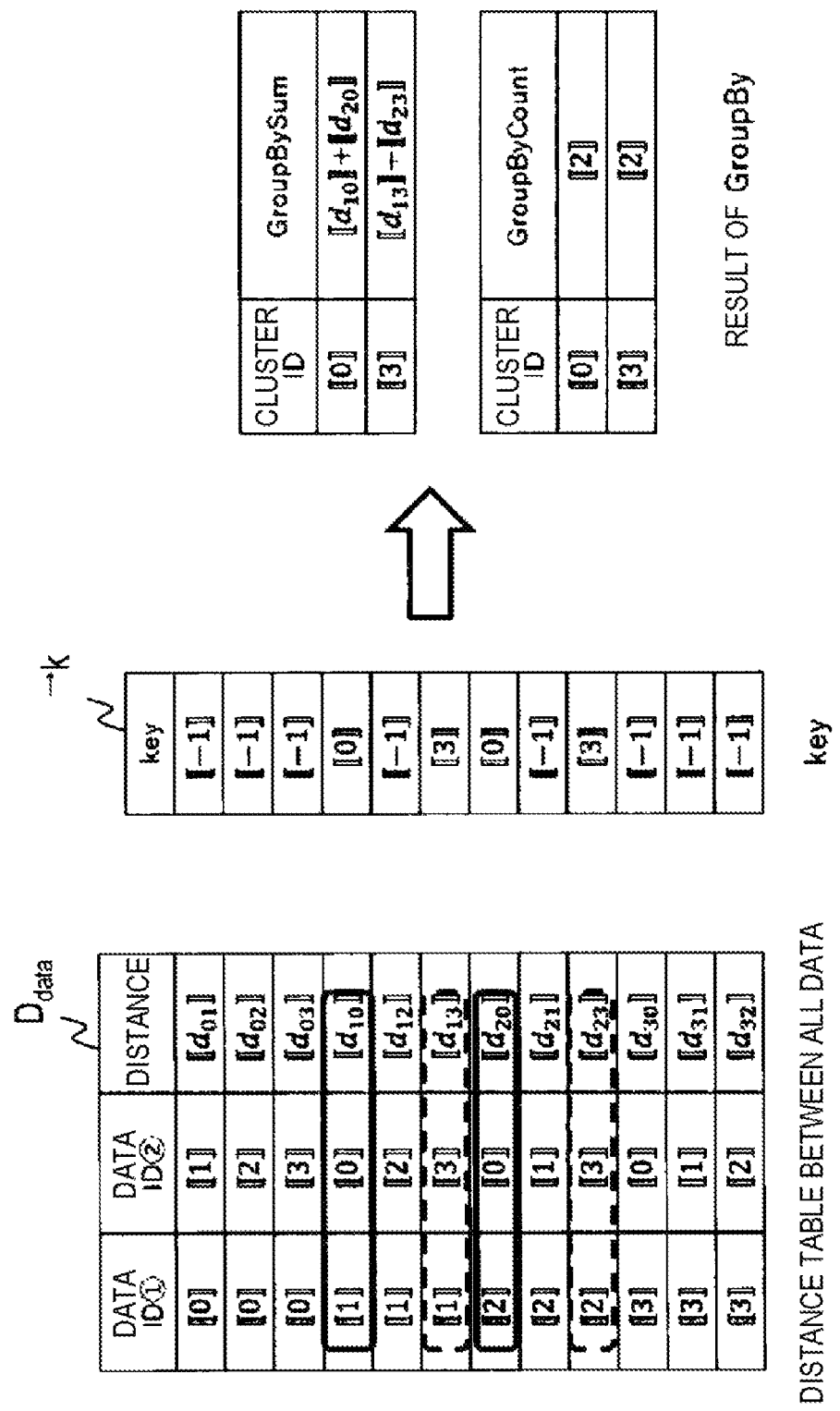
FIG. 10 is a diagram for explaining a relationship between calculation of groupBy Sum and groupBy Count and key information →k.

To obtain the distance between the new cluster and the other cluster from the inter-data distance table $D_{data}$, it is necessary to calculate each of a total value of distances and the number of data included in the cluster in an encrypted state and divide the total value by the number of data. Thus, calculation of the total value of the distances using groupBy Sum and calculation of the number of data included in a cluster using groupBy Count are performed. To perform calculation of groupBy Sum and groupBy Count, it is necessary to successfully create key information →k for performing a Group-By operation. Specifically, if key information →k as illustrated in FIG. 10 is created, a desired result of the Group-By operation can be obtained.

Figure 11:
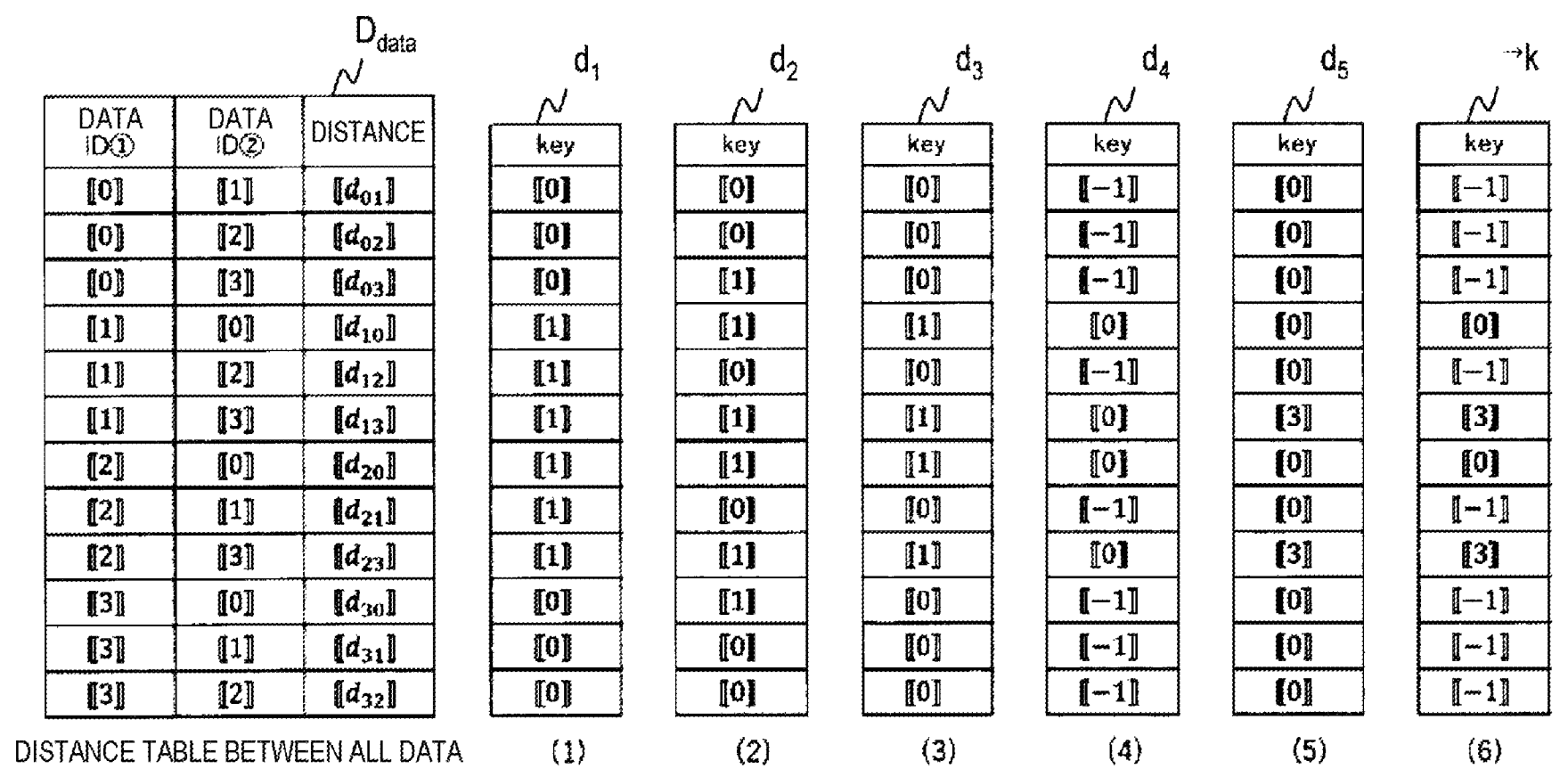

A flow of processing for actually creating the key information →k is illustrated below, and a specific example corresponding to the flow of the processing is illustrated in FIG. 11. The key information →k obtained in FIG. 11 matches the key information →k required in FIG. 10. It is sufficient that the Group-By operation is executed with the third column (distance) of the distance table between all data as a value attribute, by using the key information →k. Since information on an unnecessary portion has an ID=−1 and comes at the head, only desired information remains if elements other than the head element are extracted from a calculation result of Group-By.
1. A flag vector $d_1$ is created in which data in which ID1 of the distance table between all data is included in the two clusters to be combined is 1 and other data is 0.
2. A flag vector $d_2$ is created in which data in which ID2 of the distance table between all data is included in the two clusters to be combined is 0 and other data is 1.
3. A logical product $d_3$ of the flag vector $d_1$ and the flag vector $d_2$ is obtained.
4. A vector $d_4$ is created in which 1 is subtracted from all elements of the logical product $d_3$.

5. The logical product $d_3$ is multiplied by the cluster ID corresponding to the data ID2 to create a vector $d_5$.
6. The vector $d_4$ and the vector $d_5$ are added to obtain the key information →k.

It can be seen that the processing of 1. to 6. described above can be implemented only by a combination of light-weight operations such as equality, a logical operation, and addition/subtraction/multiplication. As a result, distance information regarding a new cluster can be calculated while all the information is encrypted such as how many pieces of data are included in which cluster and which clusters are combined.

The updateClustDist (update of the distance table between all clusters) of Algorithm 1 is implemented by deleting old distance information by Algorithm 3 and calculating the distance information regarding the new cluster by the method described above.

By implementing the hierarchical clustering on secure computation, it is possible to perform safe hierarchical clustering while keeping all the following information secret.

Feature value of data
Distances between data and clusters
Which data points or clusters are combined
What data is included in each cluster
Number of data included in each cluster Points of First Embodiment The following three points has enabled safe secure computation hierarchical clustering.

Management of data points included in each cluster by cluster ID table $C_{id}$
Management of distances between data and clusters by distance tables $D_{data}$ and $D_{clust}$
Distance calculation between clusters by Group-By operation Hereinafter, a clustering apparatus that implements the above-described secure computation hierarchical clustering will be described.

First Embodiment

Figure 12:
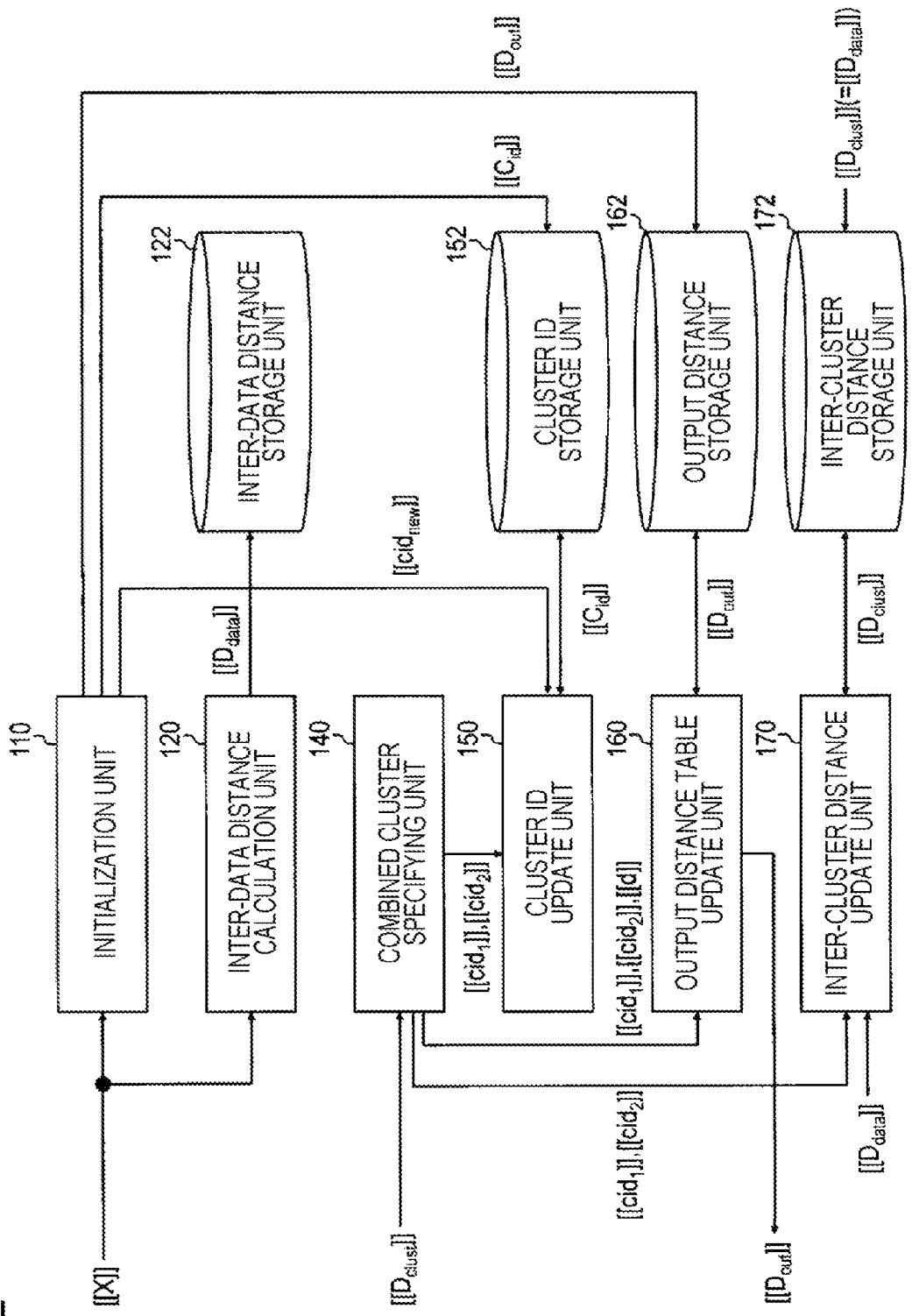
FIG. 12 is a functional block diagram of a clustering apparatus according to the first embodiment.
Figure 13:
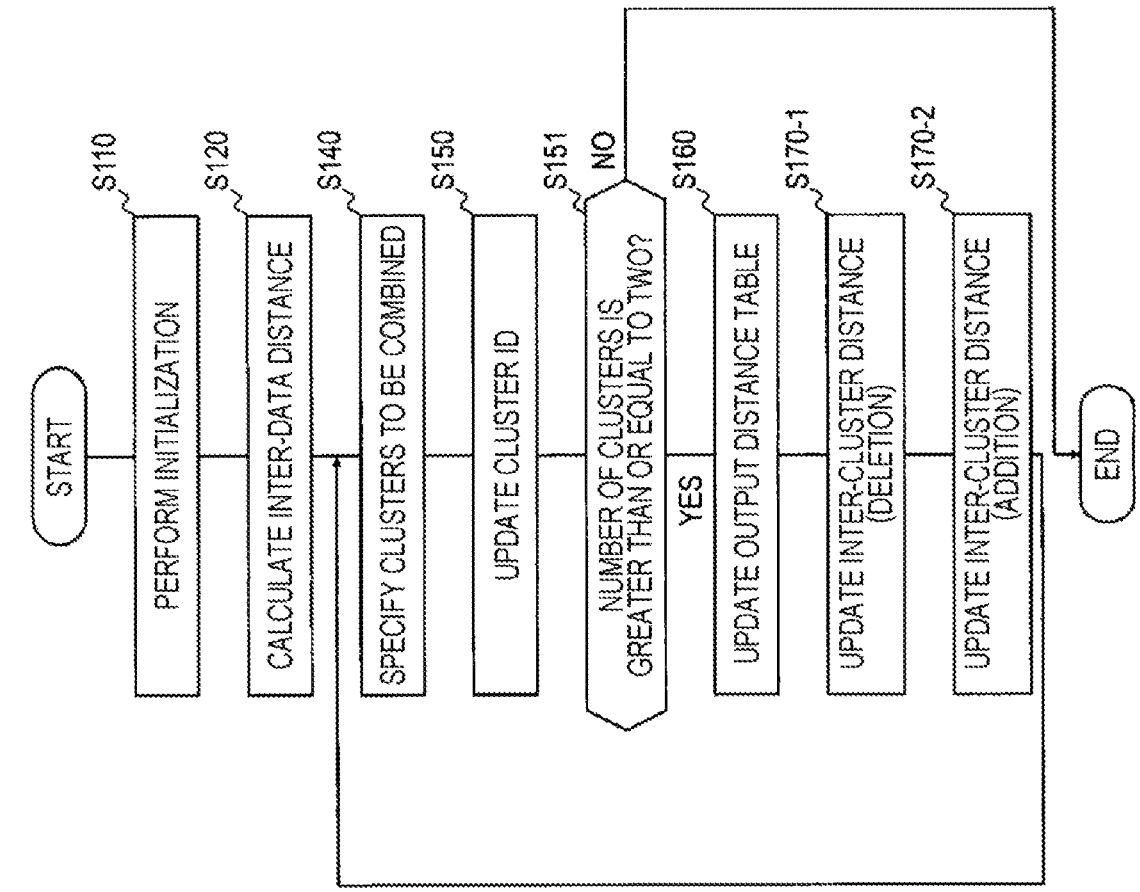
FIG. 13 is a diagram illustrating an example of a processing flow of the clustering apparatus according to the first embodiment.

FIG. 12 is a functional block diagram of a clustering apparatus according to the first embodiment, and FIG. 13 illustrates a processing flow thereof.

The clustering apparatus includes an initialization unit 110, an inter-data distance calculation unit 120, an inter-data distance storage unit 122, a combined cluster specifying unit 140, a cluster ID update unit 150, a cluster ID storage unit 152, an output distance table update unit 160, an output distance storage unit 162, an inter-cluster distance update unit 170, and an inter-cluster distance storage unit 172.

The clustering apparatus receives encrypted data [[X]] as an input, performs clustering while keeping the data secret, and outputs an output distance table [[$D_{out}$]] that is a table of distances between combined clusters.

For example, the data [[X]] is obtained by encrypting an m×n matrix. As described above, in a case where an input of the secret shuffling or the secret sorting is a matrix, shuffling is performed in such a manner that each row is interchanged while a correspondence relationship of each row is maintained.

The clustering apparatus is a special device configured such that a special program is read into a known or dedicated computer including, for example, a central processing unit (CPU), a main storage device (random access memory (RAM)), and the like. The clustering apparatus executes each of pieces of processing under control of the central processing unit, for example. Data input into the clustering apparatus and data obtained in each of the pieces of processing are stored in, for example, the main storage device, and the data stored in the main storage device is read to the central processing unit as necessary and used for other processing. At least some of the processing units of the clustering apparatus may be configured by hardware such as an integrated circuit. Each of the storage units included in the clustering apparatus can be configured by, for example, the main storage device such as the random access memory (RAM) or middleware such as a relational database and a key value store. However, each of the storage units is not necessarily provided inside the clustering apparatus, may be configured by an auxiliary storage device including a hard disk, an optical disk, or a semiconductor memory device such as a flash memory, and provided outside the clustering apparatus.

Each of the units will be described below.

<Initialization Unit 110>

The initialization unit 110 receives the data [[X]] as an input, assigns numbers (cluster IDs) to data of each row in order from 0, initializes a cluster ID table [[$C_{1a}$]] indicating a correspondence relationship between a data ID that is an identifier of the data of each row and a cluster ID, and stores the cluster ID table in the cluster ID storage unit 152. In addition, a variable [[$cid_{new}$]] indicating an ID of a new cluster obtained by combining two clusters in the subsequent processing is set as [[$cid_{new}$]]=[[m]], initialized, and output.

The initialization unit 110 initializes the output distance table [[$D_{out}$]] as an empty table and stores the table in the output distance storage unit 162.

<Inter-Data Distance Calculation Unit 120 and Inter-Data Distance Storage Unit 122>

The inter-data distance calculation unit 120 receives the data [[X]] as an input, calculates distances between all data, obtains an inter-data distance table [[$D_{data}$]] including the distances between all data (S120), and stores the table in the inter-data distance storage unit 122. The method for calculating the distance is as described above, and calculation can be calculated while the distance is kept secret.

In addition, since each data point is regarded as a cluster in the initial state, an inter-cluster distance table [[$D_{clust}$]] including distances between all clusters and the inter-data distance table [[$D_{data}$]] are the same table. Thus, the inter-data distance calculation unit 120 stores the obtained [[$D_{clust}$]](=[[$D_{data}$]]) in the inter-cluster distance storage unit 172.

<Combined Cluster Specifying Unit 140>

The combined cluster specifying unit 140 extracts the inter-cluster distance table [[$D_{clust}$]] from the inter-cluster distance storage unit 172, acquires two cluster IDs ([[$cid_1$]], [[$cid_2$]]) indicating the clusters closest to each other and a distance [[d]] therebetween (S140), and outputs them. For example, the combined cluster specifying unit 140 sorts the inter-cluster distance table [[$D_{clust}$]] while keeping the distance secret as a key, and then acquires a head element (element having the minimum distance).

<Cluster ID Update Unit 150>

The cluster ID update unit 150 receives two cluster IDs ([[$cid_1$]], [[$cid_2$]]) indicating the clusters closest to each other and the variable [[$cid_{new}$]] as inputs, extracts the cluster ID table [[$C_{id}$]] before update from the cluster ID storage unit 152, updates [[$cid_1$]] and [[$cid_2$]] that are two cluster IDs of the cluster ID table [[$C_{id}$]] to the variable [[$cid_{new}$]](S150), and stores the updated cluster ID table

[[$C_{id}$]] in the cluster ID storage unit 152. For example, the cluster ID table [[$C_{id}$]] is updated by the method described in Algorithm 2 updateCid described above. Note that the variable [[$cid_{new}$]] is incremented every time update processing is performed.

<Output Distance Table Update Unit 160 and Output Distance Storage Unit 162>

The output distance table update unit 160 receives the two cluster IDs ([[$cid_1$]], [[$cid_2$]]) (before update) indicating the clusters closest to each other and the distance [[d]] therebetween as inputs, extracts the output distance table [[$D_{out}$]] before update from the output distance storage unit 162, adds [[$cid_1$]], [[$cid_2$]], and [[d]] to the end of the output distance table [[$D_{out}$]] to update the output distance table [[$D_{out}$]], and stores the updated output distance table [[$D_{out}$]] in the output distance storage unit 162.

<Inter-Cluster Distance Update Unit 170 and Inter-Cluster Distance Storage Unit 172>

The inter-cluster distance update unit 170 receives the two cluster IDs ([[$cid_1$]], [[$cid_2$]]) (before update) indicating the clusters closest to each other as inputs, extracts the inter-cluster distance table [[$D_{clust}$]] from the inter-cluster distance storage unit 172, and deletes information that has become unnecessary due to cluster combination from the inter-cluster distance table [[$D_{clust}$]](S170-1). For example, deletion is performed by the method described in Algorithm 3 described above.

Further, the inter-cluster distance update unit 170 extracts the inter-data distance table [[$D_{data}$]] from the inter-data distance storage unit 122, calculates a distance between a newly combined cluster and another cluster, adds the distance to the inter-cluster distance table [[$D_{clust}$]], and updates the inter-cluster distance table [[$D_{clust}$]](S170-2). For example, the distance between the newly combined cluster and the other cluster is calculated by the method described in (Method for calculating inter-cluster distance) described above.

The inter-cluster distance update unit 170 stores the updated inter-cluster distance table [[$D_{clust}$]] in the inter-cluster distance storage unit 172.

The clustering apparatus repeats S140, S150, S160, S170-1, and S170-2 until the number of clusters becomes one by cluster ID update processing S150 (YES in S151), and outputs the output distance table [[$D_{out}$]] at a time when the number of clusters becomes one (NO in S151).

Effects

With the above configuration, it is possible to securely perform the hierarchical clustering while concealing all of a calculation process and values in the middle.

(Management of Distance Information [Method 2])

In hierarchical clustering [Method 2] of the second embodiment, it is necessary to store and update the distance between the clusters. In secure computation hierarchical clustering of the second embodiment, the distance information is managed by the two tables ($D_{clust}$, $D_{out}$) illustrated in FIG. 5, and the inter-data distance table $D_{data}$ illustrated in FIG. 5 is not used.

Inter-cluster distance table $D_{clust}$

Output distance table $D_{out}$

<Main Algorithm [Method 2] for Secure Computation Hierarchical Clustering>

FIG. 14 illustrates a main algorithm [Method 2] for secure computation hierarchical clustering. A difference from [Method 1] is that calculation [[$D_{data}$]]=calcDataDist([[X]]) of the table [[$D_{data}$]] of the distances between all data performed in [Method 1] is not performed in [Method 2], and details of a processing method for updateClustDist are different.

<updateClustDist [Method 2]>

In the second embodiment, [Method 2] is used as a processing method for the function updateClustDist in the ninth line. The function updateClustDist is processing of updating the distance table between all clusters, and roughly includes the following three pieces of processing.

1. A distance between a newly combined cluster and another cluster is calculated.
2. Information that has become unnecessary due to combination of clusters is deleted from [[$D_{clust}$]].
3. A newly calculated distance is added to [[$D_{clust}$]].

(Method for Calculating Inter-Cluster Distance [Lance-Williams Updating Formula])

In the second embodiment, the Lance-Williams updating formula is used as a method for calculating an inter-cluster distance.

First, a calculation procedure of a distance between a cluster newly created by the combination of the clusters and another cluster will be described. Information necessary in a case where the distance between clusters is calculated by the group average method using the Lance-Williams updating formula is only the number of data included in a cluster before combination and a distance to another cluster. To facilitate calculation on secure computation in advance, Formula (3) is transformed as follows.

[Math. 2]

$$d(C_1, C_2) = \frac{n_{1a} \times d(C_{1a}, C_2) + n_{1b} \times d(C_{1b}, C_2)}{n_{1a} + n_{1b}} \quad (7)$$

In a case where the clusters with ID=1 and ID=2 are combined to form a new cluster, and then a distance between the new cluster and another cluster (ID=0, ID=3) is obtained, necessary information is as follows.

The number of data included in the cluster with ID=1
The number of data included in the cluster with ID=2
A distance between the clusters with ID=1 and ID=0 and a distance between the clusters with ID=2 and ID=0
A distance between the clusters with ID=1 and ID=3 and a distance between the clusters with ID=2 and ID=3

Figure 15:
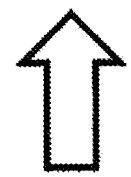
FIG. 15 is a diagram for explaining an image of processing after clusters are combined in a second embodiment.

An image of specific processing is illustrated in FIG. 15.

The number of data included in the cluster with ID=1 and the number of data included in the cluster with ID=2 can be easily obtained by, for example, the following procedure. Thus, the denominator of Formula (7) is obtained.

1. It is determined row by row whether values are matched in columns between the ID of the cluster of which the number of data is desired to be known and the cluster ID in the cluster ID table (matching rows are determined as 1, non-matching rows are determined as 0).
2. A result obtained by adding all the above results is the number of data in the cluster.

Next, the numerator of Formula (7) is calculated. A rough flow in calculating the numerator is as follows. In addition, a diagram corresponding to each of Procedures is illustrated in FIG. 16.

1. A row necessary for calculating a new distance is extracted from the distance table between all clusters.
2. A distance regarding the cluster with ID=1 is multiplied by the number of data in the cluster with ID=1.

3. A distance regarding the cluster with ID=2 is multiplied by the number of data in the cluster with ID=2.
4. Add results of Procedures 2 and 3.

First, a method for implementing Procedure 1 will be described. The row necessary for calculating the new distance satisfy the following two conditions simultaneously.

Either the cluster ID1 or ID2 is an ID of a cluster to be combined.

The other cluster ID is an ID of a cluster that is not included in the cluster to be combined.

For example, in this example, it is sufficient that only a row is extracted in which either the cluster ID1 or ID2 has an ID=1 or ID=2 and the other has an ID=0 or ID=3.

Next, a method for implementing Procedures 2 and 3 will be described. Since the number of data in each cluster is known when the denominator is calculated earlier, description thereof will be omitted. For example, the following procedure can be considered as a method for multiplying only the distance regarding the cluster with ID=1 by the number of data.

1. It is determined whether the ID is 1 for the column of the cluster ID1 of the table created in Procedure 1 (if the ID is 1, 1 is determined, if the ID is other than 1, 0 is determined).
2. Similarly, it is determined whether the ID is 1 for the column of ID2.
3. A logical sum of the two determination results is obtained.
4. A result of the logical sum is multiplied by the number of data.
5. The column of the distance is multiplied by the above result.

By performing this operation, a result is obtained in which only the distance regarding the cluster with ID=1 is multiplied by the number of data, and the others are 0. A similar operation is performed on the cluster with ID=2, and a result of Procedure 3 is obtained by adding two results.

Finally, processing as in Procedure 4 can be implemented by using groupBySum.

Since the numerator of Formula (7) can be calculated in Procedures 1 to 4, a distance between a cluster newly created by the combination of the clusters and another cluster can be calculated by dividing the numerator by the denominator (the number of data included in the cluster to be combined) calculated previously.

Hereinafter, a clustering apparatus that implements the above-described secure computation hierarchical clustering will be described.

Second Embodiment

Figure 17:
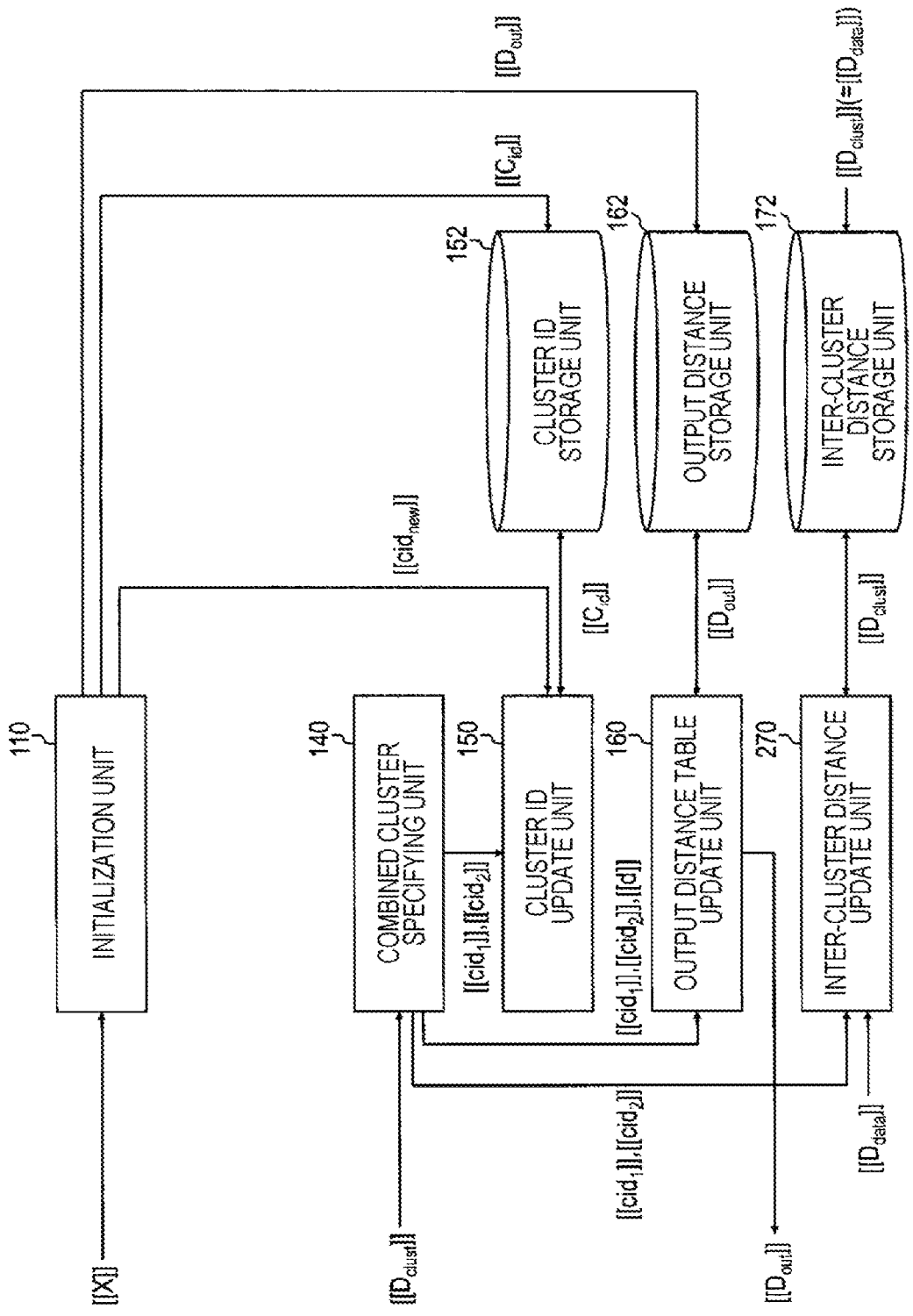
FIG. 17 is a functional block diagram of a clustering apparatus according to the second embodiment.
Figure 18:
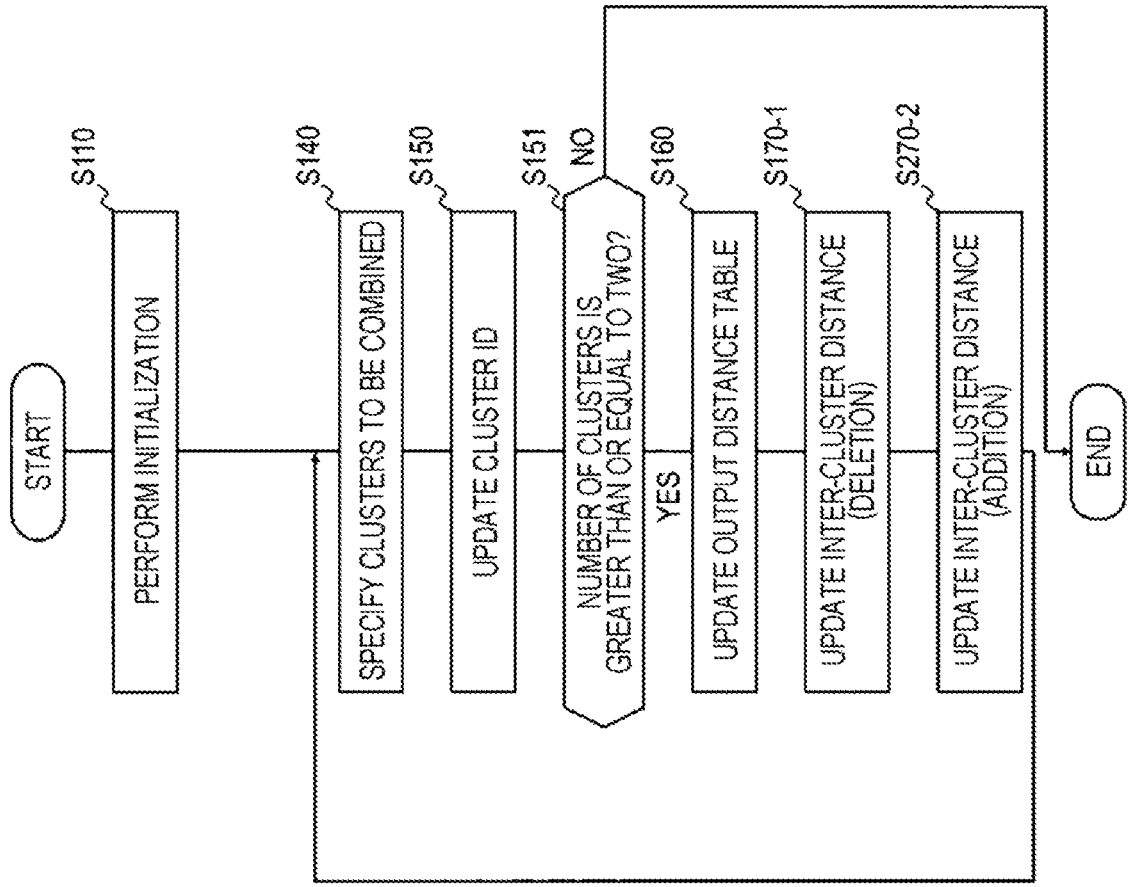
FIG. 18 is a diagram illustrating an example of a processing flow of the clustering apparatus according to the second embodiment.

FIG. 17 is a functional block diagram of a clustering apparatus according to the second embodiment, and FIG. 18 illustrates a processing flow thereof.

The clustering apparatus of the second embodiment includes the initialization unit 110, the combined cluster specifying unit 140, the cluster ID update unit 150, the cluster ID storage unit 152, the output distance table update unit 160, the output distance storage unit 162, an inter-cluster distance update unit 270, and the inter-cluster distance storage unit 172.

As described above, since an inter-data distance is not used in the second embodiment, the inter-data distance calculation unit 120 and the inter-data distance storage unit 122 existing in the first embodiment are omitted. In addition, in the second embodiment, since the inter-cluster distance is calculated by using the Lance-Williams updating formula, the inter-cluster distance update unit 170 in the first embodiment is changed to an inter-cluster distance update unit 270 in the present embodiment. Hereinafter, step S270-2 different in processing from the first embodiment will be described.

The inter-cluster distance update unit 270 calculates a distance between a newly combined cluster and another cluster on the basis of the Lance-Williams updating formula (Formula (7)) on the basis of the number of data $n_{1a}$ and $n_{1b}$ included in the respective two clusters ($C_{1a}$, $C_{1b}$) to be combined, a distance $d(C_{1a}, C_2)$ between one cluster $C_{1a}$ of the clusters to be combined and the cluster $C_2$ not to be combined, and a distance $d(C_{1b}, C_2)$ between the other cluster $C_{1b}$ of the clusters to be combined and the cluster $C_2$ not to be combined, adds the distance to the inter-cluster distance table [[$D_{clust}$]], and updates the inter-cluster distance table [[$D_{clust}$]](S270-2). Details of the processing has been described in (Method for calculating inter-cluster distance [Lance-Williams updating formula]).

Modifications

In the above-described embodiments, the Euclidean distance is used as a method for calculating the distance between the data, and the group average method is used as a method for calculating the distance between the clusters; however, other methods may be used.

Other Modifications

The present invention is not limited to the above embodiments and modifications. For example, various kinds of processing described above may be executed not only in time series in accordance with the description but also in parallel or individually in accordance with processing abilities of the devices that execute the processing or as necessary. In addition, modifications can be made as needed within the gist of the present invention.

<Program and Recording Medium>

Figure 19:
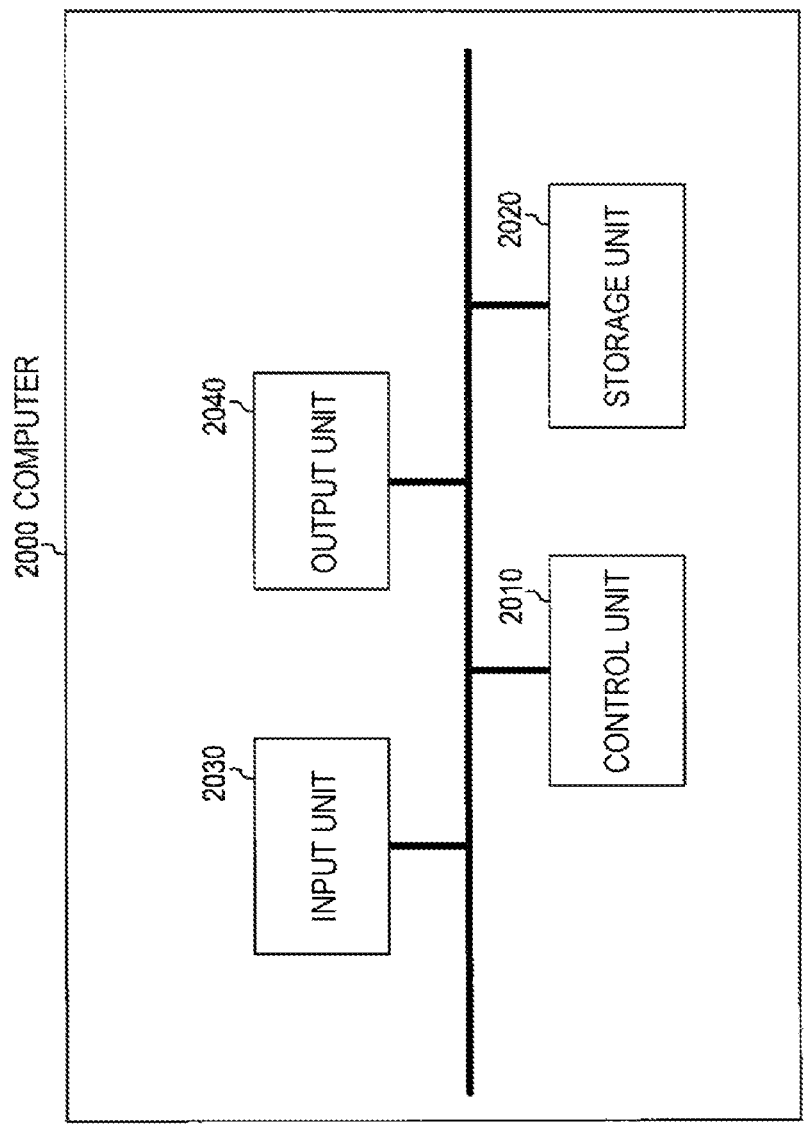
FIG. 19 illustrates a configuration example of a computer to which the present method is applied.

The above various kinds of processing can be implemented by causing a storage unit 2020 of a computer illustrated in FIG. 19 to read a program for executing each step of the above method and causing a control unit 2010, an input unit 2030, an output unit 2040, and the like to operate the program.

The program in which the processing content is described can be recorded in a computer-readable recording medium. The computer-readable recording medium may be, for example, any recording medium such as a magnetic recording device, an optical disk, a magneto-optical recording medium, or a semiconductor memory.

In addition, the program is distributed by, for example, selling, transferring, or renting a portable recording medium such as a DVD or a CD-ROM in which the program is recorded. Further, a configuration may also be employed in which the program is stored in a storage device of a server computer and the program is distributed by transferring the program from the server computer to other computers via a network.

For example, a computer that executes such a program first temporarily stores a program recorded in a portable recording medium or a program transferred from the server computer in a storage device of the computer. Then, when executing processing, the computer reads the program stored in the recording medium of the computer and executes processing according to the read program. In addition, as another mode of the program, the computer may read the program directly from the portable recording medium and execute processing according to the program, or alternatively, the computer may sequentially execute processing according to a received program every time the program is transferred from the server computer to the computer. In addition, the above-described processing may be executed by a so-called application service provider (ASP) type service that implements a processing function only by an execution instruction and result acquisition without transferring the program from the server computer to the computer. Note that the program in the present embodiment includes information that is used for processing by an electronic computer and is equivalent to the program (data or the like that is not a direct command to the computer but has property that defines processing performed by the computer).

In addition, although the present devices are each configured by executing a predetermined program on a computer in the present embodiments, at least part of the processing content may be implemented by hardware.

The invention claimed is:

1. A clustering apparatus comprising:
    a processor and a memory to store instructions, the instructions are executed by the processor to perform:
    combine two clusters closest to each other and updates a cluster ID of a cluster ID table in which a data ID and a cluster ID are associated with each other on a one-to-one basis; and
    execute deletion processing of deleting information corresponding to clusters to be combined from an inter-cluster distance table that is a table of distances between all clusters and addition processing of adding a distance between a newly combined cluster and another cluster to the inter-cluster distance table, and update the inter-cluster distance table, wherein
        information of the cluster ID table and the inter-cluster distance table is encrypted, and
        processing in updating the cluster ID and the addition processing in processing in updating the inter-cluster distance are performed by using information encrypted without being decrypted.

2. The clustering apparatus according to claim 1, further comprising:
    the processor configured to;
    add two cluster IDs of clusters to be combined and a distance between the clusters to an output distance table that is a table of distances between clusters combined, and update the output distance table, wherein
        information of the output distance table is encrypted, and
        processing in updating the output distance table is performed by using information encrypted without being decrypted.

3. The clustering apparatus according to claim 1, wherein the processing in updating inter-cluster distance, the processor uses an inter-data distance table that is a table of distances between all data, and two cluster IDs of clusters to be combined, to generate key information is used for extracting necessary information from the inter-data distance table wherein performing the addition processing in processing updating the inter-cluster distance, and calculating, to the inter-cluster distance table, a distance between a newly combined cluster and another cluster by using the key information and the inter-data distance table.

4. The clustering apparatus according to claim 1, wherein processing in updating the inter-cluster distance, the processor calculates a distance between a newly combined cluster and another cluster on a basis of Lance-Williams updating formula:

$$d(C_1, C_2) = \frac{n_{1a} \times d(C_{1a}, C_2) + n_{1b} \times d(C_{1b}, C_2)}{n_{1a} + n_{1b}}$$

on a basis of a number of data $n_{1a}$ and $n_{1b}$ included in respective two clusters ($C_{1a}$, $C_{1b}$) to be combined, a distance $d(C_{1a}, C_2)$ between the cluster $C_{1a}$ that is one of the clusters to be combined and a cluster $C_2$ not combined, and a distance $d(C_{1b}, C_2)$ between the cluster $C_{1b}$ that is another of the clusters to be combined and the cluster $C_2$ not combined.

5. A clustering method performed by a clustering apparatus, wherein a processor and a memory to store instructions, the instructions are executed by the processor to perform the clustering method comprising:
    a cluster ID update step of combining two clusters closest to each other and updating a cluster ID of a cluster ID table in which a data ID and a cluster ID are associated with each other on a one-to-one basis; and
    an inter-cluster distance update step of executing deletion processing of deleting information corresponding to clusters to be combined from an inter-cluster distance table that is a table of distances between all clusters and addition processing of adding a distance between a newly combined cluster and another cluster to the inter-cluster distance table, and updating the inter-cluster distance table, wherein
        information of the cluster ID table and the inter-cluster distance table is encrypted, and
        processing in the cluster ID update step and the addition processing in the inter-cluster distance update step are performed by using information encrypted without being decrypted.

6. The clustering method according to claim 5, further comprising:
    an output distance table update step of adding two cluster IDs of clusters to be combined and a distance between the clusters to an output distance table that is a table of distances between clusters combined, and updating the output distance table, wherein
    information of the output distance table is encrypted, and
    processing in the output distance table update step is performed by using information encrypted without being decrypted.

7. The clustering method according to claim 5, wherein the inter-cluster distance update step uses an inter-data distance table that is a table of distances between all data, and two cluster IDs of clusters to be combined, to generate key information is used for extracting necessary information from the inter-data distance table wherein performing the addition processing in the inter-cluster distance update step, and calculating, to the inter-cluster distance table, a distance between a newly combined cluster and another cluster by using the key information and the inter-data distance table.

8. The clustering method according to claim 5, wherein the inter-cluster distance update step calculates a distance between a newly combined cluster and another cluster on a basis of Lance-Williams updating formula:

$$d(C_1, C_2) = \frac{n_{1a} \times d(C_{1a}, C_2) + n_{1b} \times d(C_{1b}, C_2)}{\cdots \cdot \cdots}$$

on a basis of a number of data $n_{1a}$ and $n_{1b}$ included in respective two clusters ($C_{1a}$, $C_{1b}$) to be combined, a distance $d(C_{1a}, C_2)$ between the cluster $C_{1a}$ that is one of the clusters to be combined and a cluster $C_2$ not combined, and a distance $d(C_{1b}, C_2)$ between the cluster $C_{1b}$ that is another of the clusters to be combined and the cluster $C_2$ not combined.

9. A non-transitory computer-readable storage medium storing a program for causing a computer to function as the clustering apparatus according to claim 1.

\* \* \* \* \*